US011777271B2

United States Patent
Duffey et al.

(10) Patent No.: US 11,777,271 B2
(45) Date of Patent: Oct. 3, 2023

(54) METHOD OF AND APPARATUS FOR EXTENDING ELECTRODE LIFE IN A LASER CHAMBER (71) Applicant: Cymer, LLC, San Diego, CA (US)

(72) Inventors: Thomas Patrick Duffey, San Diego, CA (US); Paul Christopher Melcher, El Cajon, CA (US); Walter Dale Gillespie, Poway, CA (US)

(73) Assignee: Cymer, LLC, San Diego, CA (US)

( * ) Notice: Subject to any disclaimer, the term of this patent is extended or adjusted under 35 U.S.C. 154(b) by 520 days.

(21) Appl. No.: 16/757,553

(22) PCT Filed: Oct. 9, 2018

(86) PCT No.: PCT/US2018/055078
§ 371 (c)(1),
(2) Date: Apr. 20, 2020

(87) PCT Pub. No.: WO2019/083722
PCT Pub. Date: May 2, 2019

(65) Prior Publication Data
US 2021/0111529 A1  Apr. 15, 2021

Related U.S. Application Data

(60) Provisional application No. 62/576,371, filed on Oct. 24, 2017.

(51) Int. Cl.
H01S 3/038    (2006.01)
(52) U.S. Cl.
CPC .................. H01S 3/0388 (2013.01)
(58) Field of Classification Search
CPC .... H01S 3/0388; H01S 3/0381; H01S 3/0382; H01S 3/225; H01S 3/0971; H01S 3/09705
See application file for complete search history.

(56) References Cited

U.S. PATENT DOCUMENTS 6,151,346 A * 11/2000 Partlo ................. G03F 7/70041
372/57
6,466,602 B1 * 10/2002 Fleurov ................... H01S 3/223
372/87
(Continued)

FOREIGN PATENT DOCUMENTS

CN    103199412 A    7/2013
CN    104350650 A    2/2015
(Continued)

OTHER PUBLICATIONS

Office Action, counterpart Japanese Patent Application No. 2020-521972, dated Jul. 2, 2021, 9 pages total (including English translation of 5 pages).

(Continued)

*Primary Examiner* — Xinning (Tom) Niu
(74) *Attorney, Agent, or Firm* — DiBerardino McGovern IP Group LLC (57) ABSTRACT

Disclosed are methods of and apparatus for extending a useful lifetime of a laser discharge chamber in which a polarity of an electrode positioned at a fixed position within the chamber is caused to be positive with respect to the polarity of a second electrode defining a discharge gap with the first electrode and the first electrode is made of a material that forms an erosion resistant surface when the first electrode is used and an anode. Also disclosed is an arrangement in which a first electrode is positionable with respect a second electrode defining a discharge gap with the second electrode and the position of the first electrode controlled to maintain the width of the gap within a predetermined range.

22 Claims, 6 Drawing Sheets

(56) References Cited

U.S. PATENT DOCUMENTS

| | | | |
|---|---|---|---|
| 6,560,263 | B1 | 5/2003 | Morton et al. |
| 6,690,706 | B2 | 2/2004 | Morton et al. |
| 6,693,944 | B1* | 2/2004 | Hug .................. H01S 3/031 |
| | | | 372/90 |
| 7,301,980 | B2 | 11/2007 | Steiger et al. |
| 7,856,044 | B2* | 12/2010 | Sandstrom ............. H01S 3/038 |
| | | | 372/87 |
| 9,246,298 | B2 | 1/2016 | Kardokus et al. |
| 9,742,141 | B2* | 8/2017 | Tsushima ............... H01S 3/036 |
| 2004/0022292 | A1* | 2/2004 | Morton ................. H01S 3/225 |
| | | | 372/87 |
| 2006/0078028 | A1 | 4/2006 | Kakizaki et al. |
| 2007/0253459 | A1 | 11/2007 | Sandstrom et al. |
| 2008/0067453 | A1 | 3/2008 | Ivanov et al. |
| 2011/0020752 | A1 | 1/2011 | Sidelnikov et al. |
| 2013/0329763 | A1 | 12/2013 | Kardokus et al. |
| 2014/0023101 | A1 | 1/2014 | Wang et al. |
| 2015/0194781 | A1 | 7/2015 | Asayama et al. |
| 2016/0365696 | A1 | 12/2016 | Tsushima et al. |
| 2017/0346252 | A1 | 11/2017 | Katsuumi et al. |
| 2021/0028596 | A1* | 1/2021 | Loch .................... B23K 26/382 |

FOREIGN PATENT DOCUMENTS

| | | |
|---|---|---|
| JP | S63229789 A | 9/1988 |
| JP | 2002057386 A | 2/2002 |
| JP | 2010525571 A | 7/2010 |
| JP | 2012023172 A | 2/2012 |
| JP | 2014511036 A | 5/2014 |
| TW | 200807165 A | 2/2008 |
| TW | 200938961 A | 9/2009 |
| WO | 2014046186 A1 | 3/2014 |
| WO | 2016143105 A1 | 9/2016 |

OTHER PUBLICATIONS

Office Action, counterpart Korean Patent Application No. 10-2020-7011634, dated Sep. 24, 2021, 13 pages total (including English translation of 5 pages).

Office Action, counterpart Korean Patent Application No. 10-2020-7011634, dated Mar. 15, 2021, 13 pages total including English translation of 5 pages).

Blaine R. Copenheaver, U.S. International Searching Authority, International Search Report and Written Opinion, corresponding PCT Application No. PCT/US2018/055078, dated Dec. 14, 2018, 15 pages total.

Office Action, counterpart Chinese Patent Application No. 201880069267.2, dated Jul. 15, 2022, 21 pages total (including partial English translation of 10 pages).

Office Action, counterpart Korean Patent Application No. 10-2022-7019481, dated Jan. 5, 2023, 8 pages total (including English translation of 3 pages).

* cited by examiner

METHOD OF AND APPARATUS FOR EXTENDING ELECTRODE LIFE IN A LASER CHAMBER

CROSS-REFERENCE TO RELATED APPLICATIONS

This application claims priority of U.S. provisional patent application No. 62/576,371 which was filed on Oct. 24, 2017, and which is incorporated herein in its entirety by reference.

TECHNICAL FIELD

The present disclosed subject matter relates to laser-generated light sources such as are used for integrated circuit photolithographic manufacturing processes.

BACKGROUND

In laser discharge chambers such as an ArF power ring amplifier excimer discharge chamber ("PRA") or a KrF excimer discharge chamber, electrode erosion imposes significant limits on the useful lifetime of the chamber module. One measure to extend the useful lifetime of a KrF excimer discharge chamber module involves making the anode of a material which does not exhibit wear. Information on materials suitable for use as anode materials can be found, for example, in U.S. Pat. No. 7,301,980, issued Nov. 27, 2007 and U.S. Pat. No. 6,690,706 issued Feb. 10, 2004, both of which are assigned to the assignee of the present application and both of which are hereby incorporated by reference in their entirety. Certain of these materials are not only corrosion resistant but in fact grow an erosion resistant coating ("reef") that maintains the anode surface in its original position, i.e., substantially the same position as when the electrode is new.

The erosion resistant coating that forms on the anode does not form on the cathode. Thus, the use a material that forms an erosion resistant coating as an anode will not form that coating when it is used as a cathode material and does not prevent the cathode from eroding as the laser fires.

In current chambers, erosion leads to both an increase in the width of the discharge gap and broadening of the discharge. Both of these phenomena lead to lower energy density in the discharge which in turn drives a need to increase the voltage differential across the electrodes necessary to maintain energy output. In addition, discharge broadening reduces the clearing ratio of the gas flow leading to increased downstream arcing leading to energy dropouts and resultant dose errors. Once the dose error rate increases above a predetermined threshold the chamber is deemed to have reached the end of its useful life and must be replaced.

Thus, while it has proven possible in certain discharge chamber designs to provide anodes that can last indefinitely long, it has not proven possible to provide cathodes that can last indefinitely long, so that cathode life is still the limiting factor in the overall chamber lifetime. There is thus a need for a configuration that greatly extends the cathode life and/or that compensates for cathode erosion.

SUMMARY

The following presents a simplified summary of one or more embodiments in order to provide a basic understanding of the present invention. This summary is not an extensive overview of all contemplated embodiments, and is not intended to identify key or critical elements of all embodiments nor delineate the scope of any or all embodiments. Its sole purpose is to present some concepts of one or more embodiments in a simplified form as a prelude to the more detailed description that is presented later.

According to one aspect, the subject matter of the present disclosure extends chamber life by reversing the polarity of the discharge. Thus the upper electrode becomes the anode and is made of a material that forms a protective layer inhibiting erosion. The benefits of this arrangement are increased through the use of a mechanism attached to the lower electrode that can elevate the lower electrode (now the cathode) which will be more prone to erosion to compensate for that erosion progressively throughout the life of the chamber.

According to one aspect there is disclosed a laser comprising a discharge chamber, a first electrode positioned at least partially within the discharge chamber, a second electrode positioned at least partially within the discharge chamber, the first electrode having a first discharge surface and the second electrode having a second discharge surface, the first discharge surface and the second discharge surface being arranged to confront one another across a gap, and a motor mechanically coupled to the second electrode to position the second discharge surface to control a width of the gap, with the polarity of the first electrode being positive with respect to a polarity of the second electrode so that the first electrode functions as an anode during a discharge in the discharge chamber. The position of the first electrode may be fixed with respect to the discharge chamber. The first electrode may comprise a material that forms an erosion resistant coating when the first electrode functions as an anode during a discharge in the discharge chamber. The first electrode may additionally or alternatively include an applied erosion resistant coating. The laser may also include a controller connected to the motor wherein the controller supplies a control signal to control the motor to in turn control the width of the gap. The controller may control the motor to maintain the width of the gap within a predetermined range. The controller may develop a control signal based at least in part on a magnitude of a voltage differential between the first electrode and the second electrode required to maintain substantially constant output power during discharge or on the gap width as measured by a detector or as inferred. The laser may include a power supply electrically connected to the first electrode and the second electrode for supplying a plurality of pulses to at least one of the first electrode and the second electrode, the power supply including a commutator module and a compression head module, wherein the commutator module and a compression head module are modified such that the polarity of the first electrode is positive with respect to a polarity of the second electrode so that the first electrode functions as an anode during the pulses.

According to another aspect there is disclosed a laser comprising a discharge chamber, a first electrode positioned at least partially within the discharge chamber and fixed with respect to the discharge chamber, and a second electrode positioned at least partially within the discharge chamber, the first electrode having a first discharge surface and the second electrode having a second discharge surface, the first discharge surface and the second discharge surface being arranged to confront one another across a gap, a polarity of the first electrode being positive with respect to a polarity of the second electrode so that the first electrode functions as an anode during a discharge in the discharge chamber, the first electrode comprising a material that forms an erosion resistant coating when the first electrode functions as an anode during a discharge in the discharge chamber. The laser may further comprise a motor mechanically coupled to the second electrode to position the second discharge surface to control a width of the gap and a controller connected to the motor wherein the controller supplies a control signal to control the motor to control the width of the gap. The controller may control the motor to maintain the width of the gap within a predetermined range. The controller may develop the control signal based at least in part on a magnitude of a voltage differential between the first electrode and the second electrode during discharge. The laser may further comprise a detector connected to the controller for measuring a width of the gap and providing a signal indicative of the gap width wherein the controller develops the control signal based at least in part on the gap width as measured by the detector.

According to another aspect there is disclosed a method of controlling operation of a laser, the laser including a discharge chamber and a first electrode and a second electrode spaced apart by a gap, the second electrode being positionable to establish a width of the gap, the method comprising the steps of operating the laser by causing a discharge to occur in the discharge chamber between the first electrode and the second electrode wherein a polarity of the first electrode is positive with respect to a polarity of the second electrode so that the first electrode functions as an anode during the discharge chamber, and controlling a position of the second electrode to maintain the width of the gap within a predetermined range. The position of the second electrode may be based at least in part on a magnitude of a voltage differential between the first electrode and the second electrode required to maintain substantially constant output power during discharge or at least in part on the gap width as measured in the measuring step or at least in part on a number of discharges that have occurred in the discharge chamber.

DETAILED DESCRIPTION

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting the specific design details described below. In other instances, well-known structures and devices are shown in block diagram form in order to facilitate description of one or more embodiments. The following presents a simplified summary of one or more embodiments in order to provide a basic understanding of the embodiments. This summary is not an extensive overview of all contemplated embodiments, and is not intended to identify key or critical elements of all embodiments nor delineate the scope of any or all embodiments.

Figure 1:
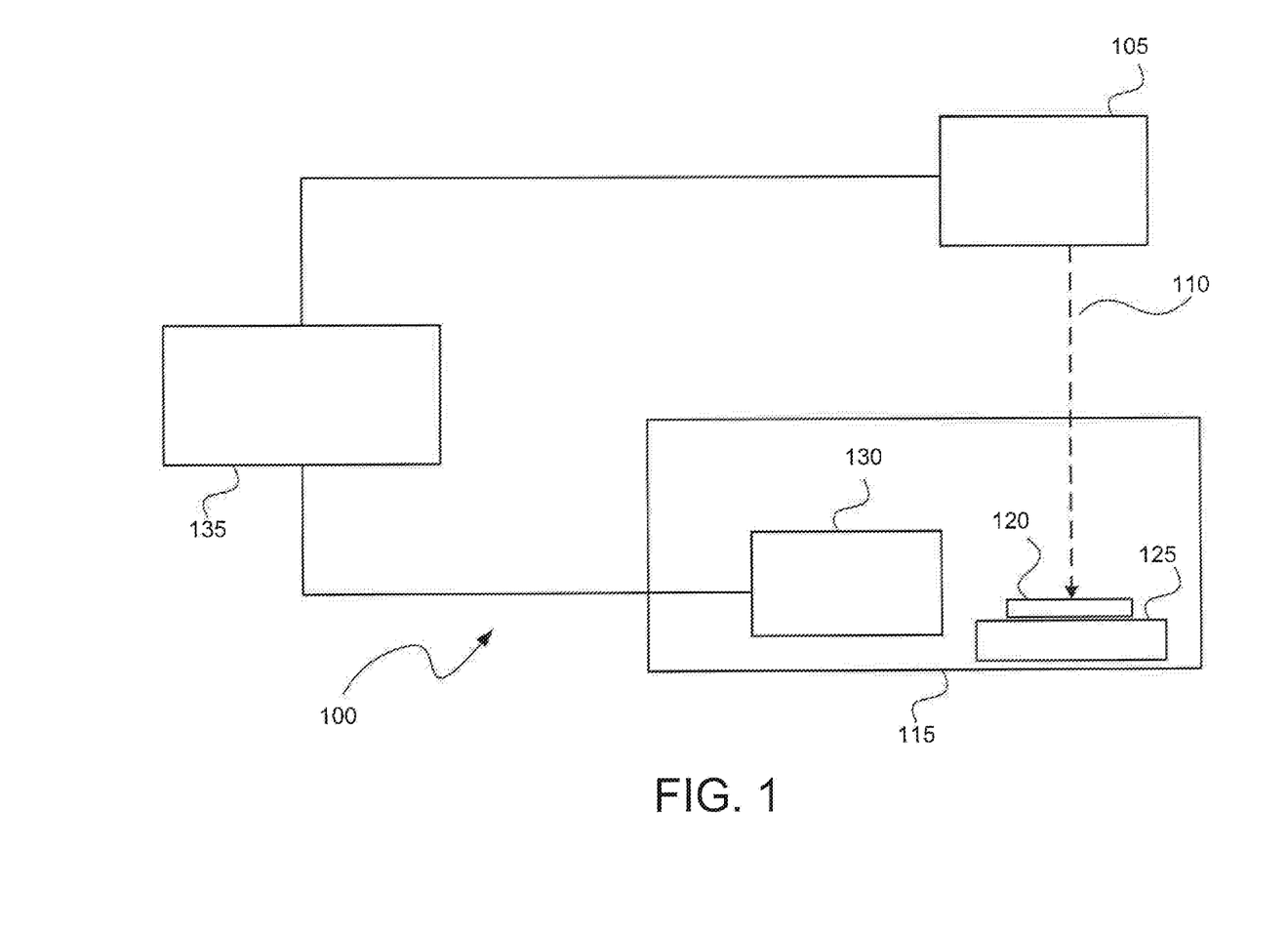
FIG. 1 shows a schematic, not to scale, view of an overall broad conception of a photolithography system according to an aspect of the disclosed subject matter.

Referring to FIG. 1, a photolithography system 100 that includes an illumination system 105. As described more fully below, the illumination system 105 includes a light source that produces a pulsed light beam 110 and directs it to a photolithography exposure apparatus or scanner 115 that patterns microelectronic features on a wafer 120. The wafer 120 is placed on a wafer table 125 constructed to hold wafer 120 and connected to a positioner configured to accurately position the wafer 120 in accordance with certain parameters.

The photolithography system 100 uses a light beam 110 having a wavelength in the deep ultraviolet (DUV) range, for example, with wavelengths of 248 nanometers (nm) or 193 nm. The minimum size of the microelectronic features that can be patterned on the wafer 120 depends on the wavelength of the light beam 110, with a lower wavelength resulting in a smaller minimum feature size. When the wavelength of the light beam 110 is 248 nm or 193 nm, the minimum size of the microelectronic features can be, for example, 50 nm or less. The bandwidth of the light beam 110 can be the actual, instantaneous bandwidth of its optical spectrum (or emission spectrum), which contains information on how the optical energy of the light beam 110 is distributed over different wavelengths. The scanner 115 includes an optical arrangement having, for example, one or more condenser lenses, a mask, and an objective arrangement. The mask is movable along one or more directions, such as along an optical axis of the light beam 110 or in a plane that is perpendicular to the optical axis. The objective arrangement includes a projection lens and enables the image transfer to occur from the mask to the photoresist on the wafer 120. The illumination system 105 adjusts the range of angles for the light beam 110 impinging on the mask. The illumination system 105 also homogenizes (makes uniform) the intensity distribution of the light beam 110 across the mask.

The scanner 115 can include, among other features, a lithography controller 130, air conditioning devices, and power supplies for the various electrical components. The lithography controller 130 controls how layers are printed on the wafer 120. The lithography controller 130 includes a memory that stores information such as process recipes. A process program or recipe determines the length of the exposure on the wafer 120 based on, for example, the mask used, as well as other factors that affect the exposure. During lithography, a plurality of pulses of the light beam 110 illuminates the same area of the wafer 120 to constitute an illumination dose.

The photolithography system 100 also preferably includes a control system 135. In general, the control system 135 includes one or more of digital electronic circuitry, computer hardware, firmware, and software. The control system 135 also includes memory which can be read-only memory and/or random access memory. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM disks.

The control system 135 can also include one or more input devices (such as a keyboard, touch screen, microphone, mouse, hand-held input device, etc.) and one or more output devices (such as a speaker or a monitor). The control system 135 also includes one or more programmable processors, and one or more computer program products tangibly embodied in a machine-readable storage device for execution by one or more programmable processors. The one or more programmable processors can each execute a program of instructions to perform desired functions by operating on input data and generating appropriate output. Generally, the processors receive instructions and data from the memory. Any of the foregoing may be supplemented by, or incorporated in, specially designed ASICs (application-specific integrated circuits). The control system 135 can be centralized or be partially or wholly distributed throughout the photolithography system 100.

Figure 2:
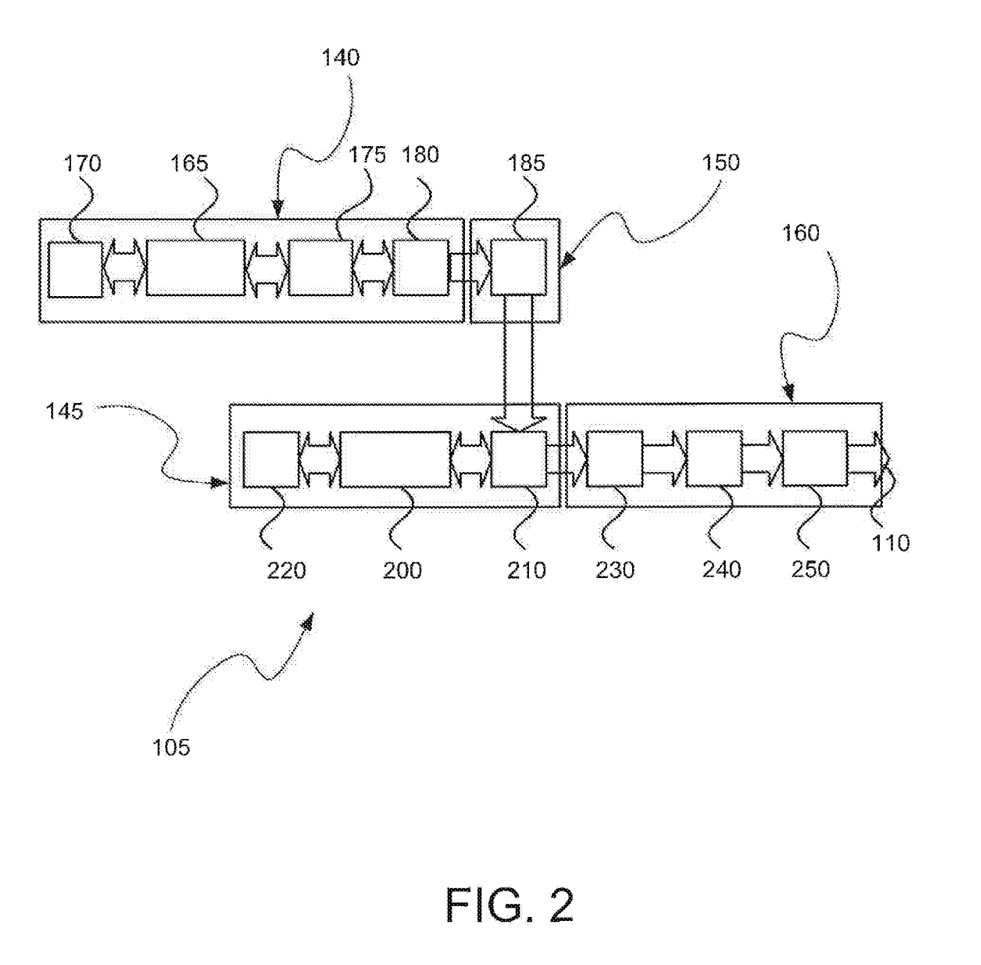
FIG. 2 shows a schematic, not to scale, view of an overall broad conception of an illumination system according to an aspect of the disclosed subject matter.

Referring to FIG. 2, an exemplary illumination system 105 is a pulsed laser source that produces a pulsed laser beam as the light beam 110. FIG. 2 shows illustratively and in block diagram a gas discharge laser system according to an embodiment of certain aspects of the disclosed subject matter. The gas discharge laser system may include, e.g., a solid state or gas discharge seed laser system 140, an amplification stage, e.g., a power ring amplifier ("PRA") stage 145, relay optics 150 and laser system output subsystem 160. The seed system 140 may include, e.g., a master oscillator ("MO") chamber 165.

The seed laser system 140 may also include a master oscillator output coupler ("MO OC") 175, which may comprise a partially reflective mirror, forming with a reflective grating (not shown) in a line narrowing module ("LNM") 170, an oscillator cavity in which the seed laser 140 oscillates to form the seed laser output pulse, i.e., forming a master oscillator ("MO"). The system may also include a line-center analysis module ("LAM") 180. The LAM 180 may include an etalon spectrometer for fine wavelength measurement and a coarser resolution grating spectrometer. A MO wavefront engineering box ("WEB") 185 may serve to redirect the output of the MO seed laser system 140 toward the amplification stage 145, and may include, e.g., beam expansion with, e.g., a multi prism beam expander (not shown) and coherence busting, e.g., in the form of an optical delay path (not shown).

The amplification stage 145 may include, e.g., a PRA lasing chamber 200, which may also be an oscillator, e.g., formed by seed beam injection and output coupling optics (not shown) that may be incorporated into a PRA WEB 210 and may be redirected back through the gain medium in the chamber 200 by a beam reverser 220. The PRA WEB 210 may incorporate a partially reflective input/output coupler (not shown) and a maximally reflective mirror for the nominal operating wavelength (e.g., at around 193 nm for an ArF system) and one or more prisms.

A bandwidth analysis module ("BAM") 230 at the output of the amplification stage 145 may receive the output laser light beam of pulses from the amplification stage and pick off a portion of the light beam for metrology purposes, e.g., to measure the output bandwidth and pulse energy. The laser output light beam of pulses then passes through an optical pulse stretcher ("OPuS") 240 and an output combined autoshutter metrology module ("CASMM") 250, which may also be the location of a pulse energy meter. One purpose of the OPuS 240 may be, e.g., to convert a single output laser pulse into a pulse train. Secondary pulses created from the original single output pulse may be delayed with respect to each other. By distributing the original laser pulse energy into a train of secondary pulses, the effective pulse length of the laser can be expanded and at the same time the peak pulse intensity reduced. The OPuS 240 can thus receive the laser beam from the PRA WEB 210 via the BAM 230 and direct the output of the OPuS 240 to the CASMM 250.

Figure 3:
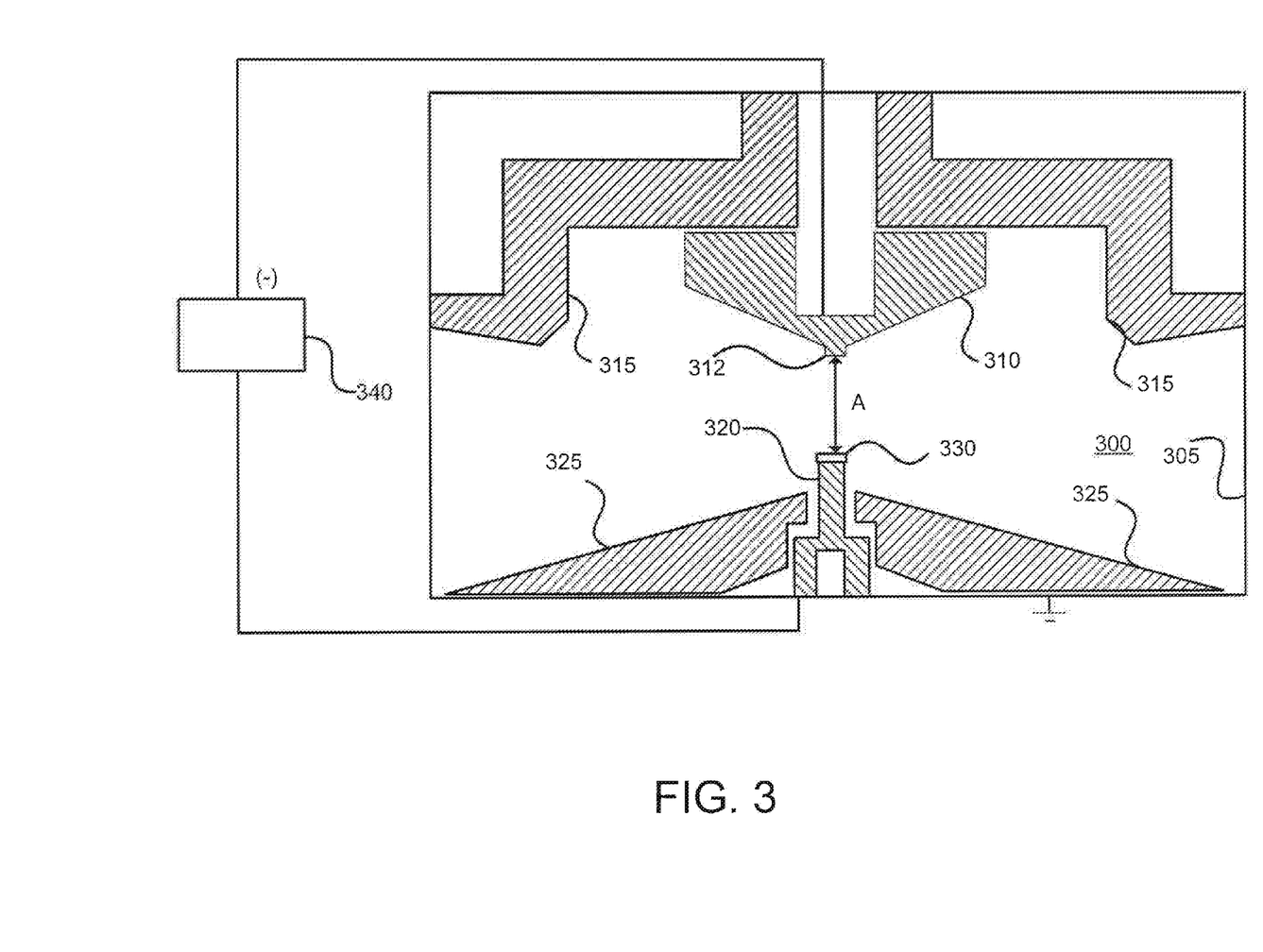
FIG. 3 is a diagrammatic cross section, not to scale, of a discharge chamber for an excimer laser according to aspects of the disclosed subject matter.

The PRA lasing chamber 200 and the MO 165 are configured as chambers in which electrical discharges between electrodes may cause lasing gas discharges in a lasing gas to create an inverted population of high energy molecules, including, e.g., Ar, Kr, and/or Xe, to produce relatively broad band radiation that may be line narrowed to a relatively very narrow bandwidth and center wavelength selected in a line narrowing module ("LNM") 170, as is known in the art. A configuration for such a chamber 300 is shown in FIG. 3, which is a highly stylized cross-sectional diagram of a discharge chamber. A chamber 300 includes an upper electrode 310 acting as a cathode and a lower electrode 320 acting as an anode. One or both of the lower electrode 300 and the upper electrode 310 may be entirely contained in the pressure envelope of chamber 300 defined by the chamber wall 305 or one of the electrodes may not be so contained. Lasing gas discharges occur between these two electrodes in a gap having a width A. Also shown in FIG. 3 are an upper insulator 315 and a lower insulator 325. The lower electrode 320 is electrically connected to the wall 305 of the chamber 300. For safety reasons it is desirable to maintain the chamber wall 300 and so the lower electrode 320 at ground potential. In the embodiment shown in FIG. 3, the upper electrode 310 is driven by a voltage supply 340 at a voltage which is negative with respect to the lower electrode 320.

When it is acting as an anode as shown in FIG. 3, the lower electrode 320 is beneficially made of a material which does not exhibit wear, but which in fact grows a corrosion coating 330 (also referred to as a "reef") that maintains the surface of the lower electrode 320 in substantially the same location as when the lower electrode 320 is new. Alternatively the electrode could be coated with an erosion resistant coating. The size of the coating 330 is exaggerated in FIG. 3 for illustration purposes. The grown version of the coating 330 does not form on the upper electrode 310 when it is acting as a cathode so that the upper electrode 310 erodes when the laser fires. In current chambers, this erosion leads to both an increase in size A of the discharge gap and broadening of the discharge. Note also that the upper electrode is provided with a small bump 312.

As mentioned, also shown in FIG. 3 is a voltage supply 340 which establishes a voltage gradient across cathode 310 and anode 320. While the notation (−) is shown for the polarity of the output of the voltage supply 340 it will be understood that this is a relative rather than absolute polarity, that is, relative to the polarity of the lower electrode 320, which will generally be in electrical contact with the body of the chamber 300 and must remain held at a ground (0) potential. The upper electrode (cathode 310) is charged to a large (~20 kV) negative voltage.

Figure 4:
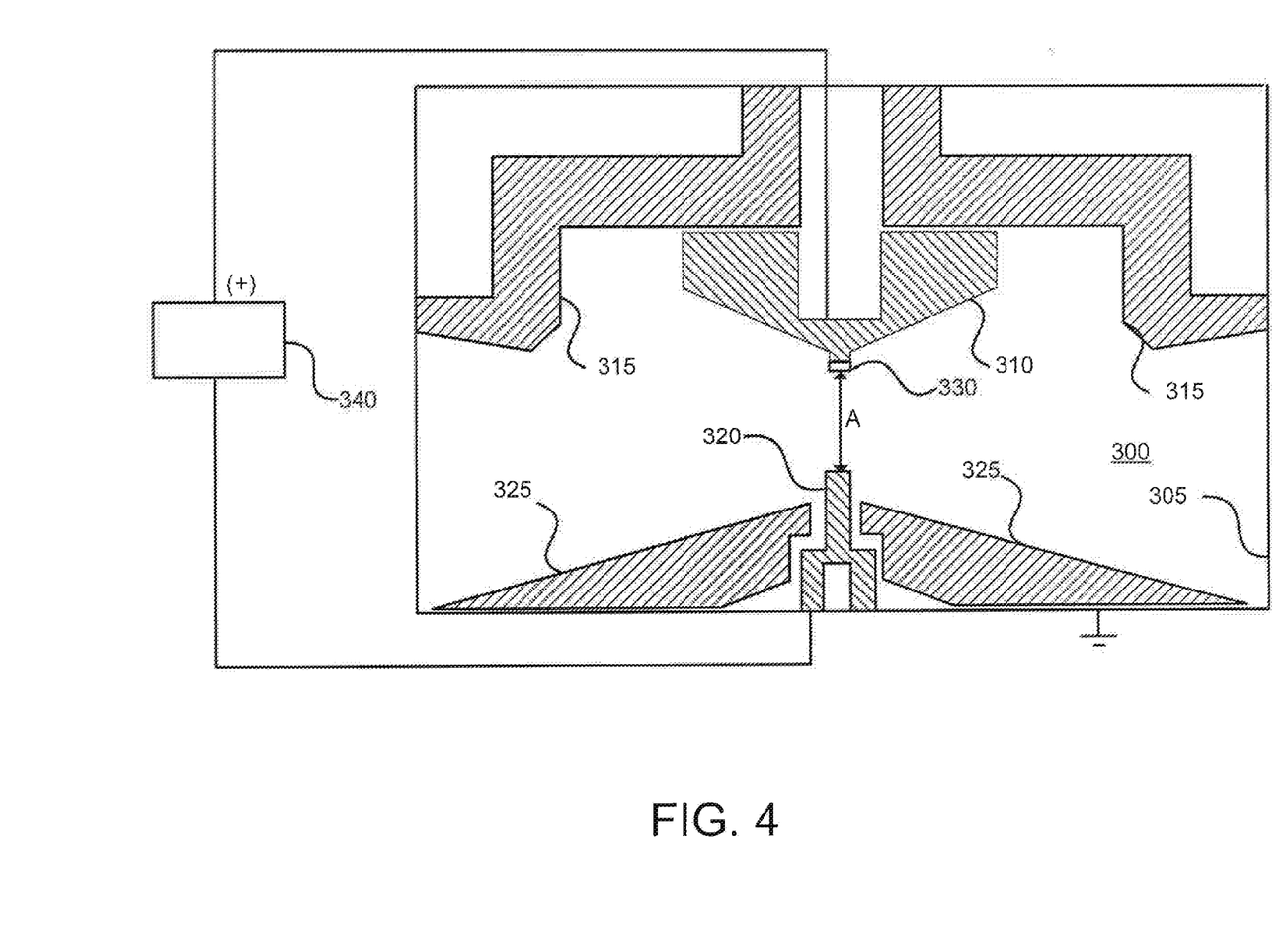
FIG. 4 is a diagrammatic cross section, not to scale, of a discharge chamber for an excimer laser according to aspects of the disclosed subject matter.

According to one aspect of the disclosed subject matter, for "reefing anode" chambers such as the KrF MO and PRA, the polarity of the discharge is reversed so that the upper electrode 310 becomes the anode and will form the protective corrosion layer 330, inhibiting erosion. This is shown in FIG. 4. In configurations in which the lower electrode 320 is in electrical contact with the chamber body and must remain held at ground, this implies that the upper electrode 310 is charged to a large (~20 kV) positive voltage. This can be accomplished through alteration of the supply 340. The supply 340 may be divided into three modules, a high voltage power supply, a commutator, and a compression head. The commutator module may include a step-up transformer. Alteration of the supply 340 may include changing the polarity of the commutator module. It may also include alteration of the supply compression head magnetics The compression head uses magnetic pulse compression to compress the pulse from the commutator. The compression head magnetics may also need to be altered to adapt to the change in polarity.

The system just described addresses wear of the upper electrode 310 but, because the lower electrode 320 becomes the cathode, the lower electrode 320 becomes the electrode subject to erosion. Also, there are discharge chambers, for example, ArF MO's, for which selection of an anode material that forms the protective corrosion layer results in unacceptable laser performance degradation, particularly at high repetition rates. To address these issues, the lower electrode anode 320 is preferably connected to a mechanism that can be used to elevate its surface progressively throughout chamber life, thereby maintaining the surface at its original (new) position. In chambers where the lower, movable electrode is maintained as the anode, erosion of the fixed upper cathode still occurs but at a rate much slower than the rate of anode erosion. An anode having a mechanically adjustable position is described, for example, in U.S. Pat. No. 9,246,298, issued Jan. 26, 2016 and assigned to the assignee of this application, the contents of which are hereby incorporated into this application in their entirety. The advantages of using an adjustable electrode are especially pronounced, however, when applied to the electrode that is more subject to wear, as is the lower electrode when it is serving as a cathode so that no corrosion resistant layer can be expected to form on it.

It is in general preferred to make the lower electrode rather than the upper electrode movable because it is preferred to have the upper electrode form part of the pressure envelope of the discharge chamber and, in the interest of maintaining low head inductance (which is critical for good efficiency) there are strong constraints on the geometry and volume claim of this electrode.

Figure 5:
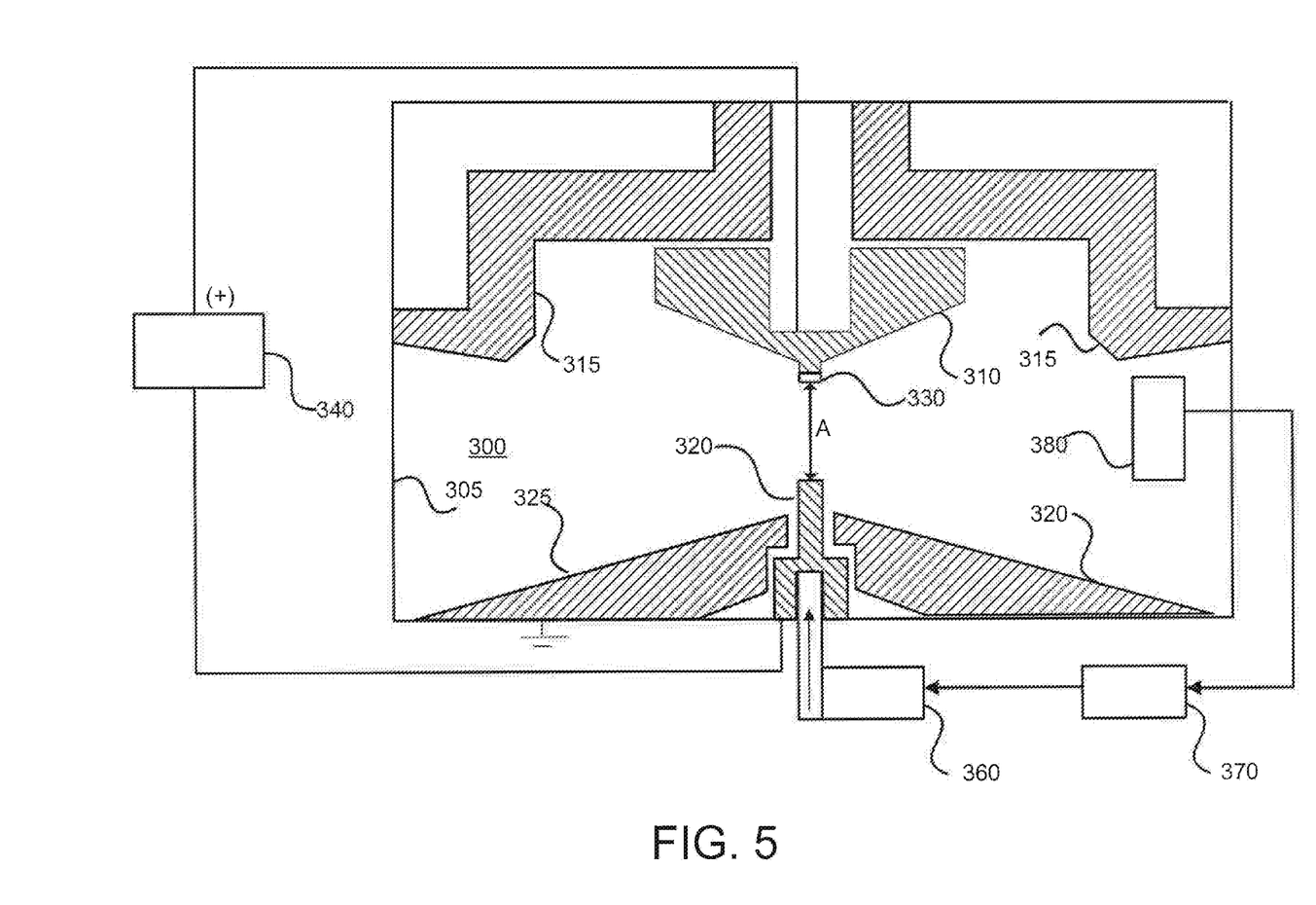
FIG. 5 is a diagrammatic cross section, not to scale, of a discharge chamber for an excimer laser according to aspects of the disclosed subject matter.

Specifically in FIG. 5, a motor 360 is mechanically coupled to the lower electrode 320 in such a way as to control the position of the top surface of the lower electrode 320 and so the width A of the gap between the lower electrode 320 and the upper electrode 310. Here and elsewhere in this specification, "motor" is used broadly to connote a device or combination of devices that can produce motion. For example, motor 360 can be a screw drive, friction drive, or rack and pinion drive coupled to a linear electric motor or piezoelectric device. The motor 360 is arranged to receive a control signal from a controller 370. The controller 370 may provide the control signal causing the motor 360 to raise the top surface of the lower electrode 320 based on the passage of elapsed operational time or the number of pulses that have occurred in the chamber. The controller 370 can also provide the control signal based on some operational parameter such as fluctuation or magnitude of the drive voltage. For example, the control signal could be based at least in part on a voltage required to achieve a fixed-target output energy. The controller 370 can also provide the control signal based on the size A of the gap between the electrodes as measured by a metrology unit 380 or as inferred by some other means.

The configuration of FIG. 5 is beneficial for chamber designs in which the upper electrode 310 is necessarily part of the pressure envelope of the chamber 300 so that provision of a mechanism to move the upper electrode 310 to compensate for its erosion is not practicable. In chamber designs in which only the lower electrode 320 is fixed then the upper electrode 310 can be configured to be positionable. In chamber designs in which neither electrode is fixed and neither is entirely within the pressure envelope of the chamber 300 then either or both electrodes can be configured to be positionable.

Figure 6:
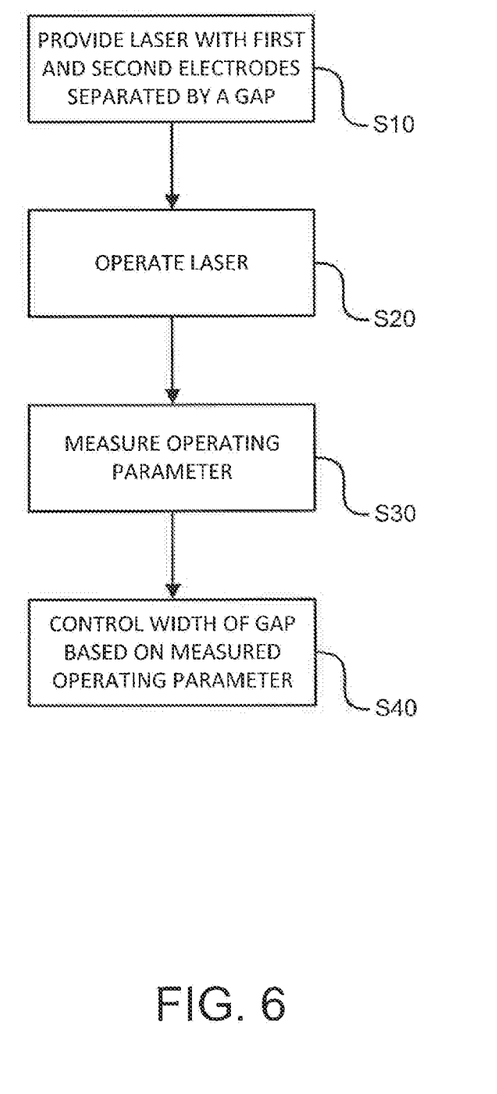
FIG. 6 is a flowchart of a method of controlling the effects of electrode erosion according to aspects of the disclosed subject matter.

FIG. 6 is a flowchart showing an example of a method of operating an arrangement such as that shown in in FIG. 5. In step S10 a laser with at least two electrodes separated by a gap is provided. It will be understood that one of the electrodes, that which is electrically connected so that it functions as the cathode, is arranged to be movable under the control of a control signal so that the width of the gap between the electrodes can be controlled automatically. In step S20 the laser is operated and in step S30 at least one operating parameter of the laser is measured. The operational parameter may be any of the parameters mentioned above such as the magnitude of elapsed operational time of the chamber, the number of pulses that have occurred in the chamber, fluctuation or magnitude of the drive voltage required to achieve a fixed-target output energy, or the size of the gap between the electrodes as measured by a metrology unit 380 or as inferred by some other means. In step S40 the width of the gap is controlled based on the measured operation parameter. For example, the movable electrode will be moved in a manner as to make the width of the gap substantially equal to a predetermined value such as the original gap width. It will be understood that the process of FIG. 6 can take place essentially continuously or it can take place at predetermined intervals.

The above description includes examples of multiple embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is construed when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The embodiments may further be described using the following clauses:

1. A laser comprising:

a discharge chamber;

a first electrode positioned at least partially within the discharge chamber;

a second electrode positioned at least partially within the discharge chamber, the first electrode having a first discharge surface and the second electrode having a second discharge surface, the first discharge surface and the second discharge surface being arranged to confront one another across a gap; and a motor mechanically coupled to the second electrode to position the second discharge surface to control a width of the gap wherein a polarity of the first electrode is positive with respect to a polarity of the second electrode so that the first electrode functions as an anode during a discharge in the discharge chamber.

2. A laser as in clause 1 wherein a position of the first electrode is fixed with respect to the discharge chamber.

3. A laser as in clause 1 wherein the first electrode comprises a material that forms an erosion resistant coating when the first electrode functions as an anode during a discharge in the discharge chamber.

4. A laser as in clause 1 further comprising an erosion resistant coating applied to the first electrode.

5. A laser as in clause 1 further comprising a controller connected to the motor wherein the controller supplies a control signal to the motor to control the width of the gap.

6. A laser as in clause 5 wherein the controller controls the motor to maintain the width of the gap within a predetermined range.

7. A laser as in clause 5 wherein the controller develops the control signal based at least in part on a magnitude of a voltage differential between the first electrode and the second electrode during discharge required to maintain substantially constant output power.

8. A laser as in clause 5 further comprising a detector connected to the controller for measuring a width of the gap and providing a signal indicative of the width wherein the controller develops the control signal based at least in part on the width as measured by the detector.

9. A laser as in clause 1 further comprising a power supply electrically connected to the first electrode and the second electrode for supplying a plurality of pulses to at least one of the first electrode and the second electrode, the power supply including a commutator module and a compression head module, wherein the commutator module and a compression head module are modified such that the polarity of the first electrode is positive with respect to a polarity of the second electrode so that the first electrode functions as an anode during the pulses.

10. A laser as in clause 5 wherein the controller develops the control signal based at least in part on a number of discharges that have occurred in the discharge chamber.

11. A laser comprising:
a discharge chamber;
a first electrode positioned at least partially within the discharge chamber and fixed with respect to the discharge chamber;
a second electrode positioned at least partially within the discharge chamber, the first electrode having a first discharge surface and the second electrode having a second discharge surface, the first discharge surface and the second discharge surface being arranged to confront one another across a gap, a polarity of the first electrode being positive with respect to a polarity of the second electrode so that the first electrode functions as an anode during a discharge in the discharge chamber, the first electrode comprising a material that forms a corrosion resistant coating when the first electrode functions as an anode during a discharge in the discharge chamber;
a motor mechanically coupled to the second electrode to position the second discharge surface to control a width of the gap; and a controller connected to the motor wherein the controller supplies a control signal to the motor to maintain the width of the gap within a predetermined range.

12. A laser as in clause 11 wherein the controller develops the control signal based at least in part on a number of discharges that have occurred in the discharge chamber.

13. A laser comprising:
a discharge chamber;
a first electrode positioned at least partially within the discharge chamber and fixed with respect to the discharge chamber;
a second electrode positioned at least partially within the discharge chamber, the first electrode having a first discharge surface and the second electrode having a second discharge surface, the first discharge surface and the second discharge surface being arranged to confront one another across a gap;
a polarity of the first electrode being positive with respect to a polarity of the second electrode so that the first electrode functions as an anode during a discharge in the discharge chamber, the first electrode comprising a material that forms an erosion resistant coating when the first electrode functions as an anode during a discharge in the discharge chamber.

14. A laser as in clause 13 further comprising a motor mechanically coupled to the second electrode to position the second discharge surface to control a width of the gap.

15. A laser as in clause 14 further comprising a controller connected to the motor wherein the controller supplies a control signal to the motor to control the width of the gap.

16. A laser as in clause 15 wherein the controller controls the motor to maintain the width of the gap within a predetermined range.

17. A laser as in clause 15 wherein the controller develops the control signal based at least in part on a magnitude of a voltage differential between the first electrode and the second electrode during discharge.

18. A laser as in clause 15 further comprising a detector connected to the controller for measuring a width of the gap and providing a signal indicative of the width wherein the controller develops the control signal based at least in part on the width as measured by the detector.

19. A laser as in clause 13 wherein the controller develops the control signal based at least in part on a number of discharges that have occurred in the discharge chamber.

20. A method of controlling operation of a laser, the laser including a discharge chamber and a first electrode and a second electrode spaced apart by a gap, the second electrode being positionable to establish a width of the gap, the method comprising the steps of:
operating the laser by causing a discharge to occur in the discharge chamber between the first electrode and the second electrode with a polarity of the first electrode being positive with respect to a polarity of the second electrode so that the first electrode functions as an anode during a discharge in the discharge chamber;
measuring an operational parameter of the laser; and
automatically controlling a position of the second electrode based at least in part on the measured operational parameter.

21. A method as in clause 20 wherein the measured operational parameter is a magnitude of a voltage differential between the first electrode and the second electrode during discharge required to achieve or maintain a predetermined output energy.

22. A method as in clause 20 wherein the measured operational parameter is a magnitude of the width of a gap between the first electrode and the second electrode.

23. A method as in clause 20 wherein the measured operational parameter is a number of discharges that have occurred in the discharge chamber.

Other implementations are within the scope of the claims.

What is claimed is:

1. A laser comprising:
   a discharge chamber;
   a first electrode positioned at least partially within the discharge chamber;
   a second electrode positioned at least partially within the discharge chamber, the first electrode having a first discharge surface and the second electrode having a second discharge surface, the first discharge surface and the second discharge surface being arranged to confront one another across a gap;
   a motor mechanically coupled to the second electrode to position the second discharge surface to control a width of the gap; and
   a controller in signal communication with the motor and adapted to control the motor to make the width of the gap substantially equal to an original gap width,
   wherein a polarity of the first electrode is positive with respect to a polarity of the second electrode so that the first electrode functions as an anode during a discharge in the discharge chamber.

2. A laser as claimed in claim 1 wherein a position of the first electrode is fixed with respect to the discharge chamber.

3. A laser as claimed in claim 1 wherein the first electrode comprises a material that forms an erosion resistant coating when the first electrode functions as an anode during a discharge in the discharge chamber.

4. A laser as claimed in claim 1 further comprising an erosion resistant coating applied to the first electrode.

5. A laser as claimed in claim 1 wherein the controller develops the control signal based at least in part on a magnitude of a voltage differential between the first electrode and the second electrode during discharge required to maintain substantially constant output power.

6. A laser as claimed in claim 1 further comprising a detector connected to the controller for measuring a width of the gap and providing a signal indicative of the width wherein the controller develops the control signal based at least in part on the width as measured by the detector.

7. A laser as claimed in claim 2 further comprising a power supply electrically connected to the first electrode and the second electrode for supplying a plurality of pulses to at least one of the first electrode and the second electrode, the power supply including a commutator module and a compression head module, wherein the commutator module and a compression head module are modified such that the polarity of the first electrode is positive with respect to a polarity of the second electrode so that the first electrode functions as an anode during the pulses.

8. A laser as claimed in claim 1 wherein the controller develops the control signal based at least in part on a number of discharges that have occurred in the discharge chamber.

9. A laser comprising:
   a discharge chamber;
   a first electrode positioned at least partially within the discharge chamber and fixed with respect to the discharge chamber;
   a second electrode positioned at least partially within the discharge chamber, the first electrode having a first discharge surface and the second electrode having a second discharge surface, the first discharge surface and the second discharge surface being arranged to confront one another across a gap, a polarity of the first electrode being positive with respect to a polarity of the second electrode so that the first electrode functions as an anode during a discharge in the discharge chamber, the first electrode comprising a material that forms a corrosion resistant coating when the first electrode functions as an anode during a discharge in the discharge chamber;
   a motor mechanically coupled to the second electrode to position the second discharge surface to control a width of the gap; and
   a controller connected to the motor wherein the controller supplies a control signal to the motor to make the width of the gap substantially equal to an original gap width.

10. A laser as claimed in claim 9 wherein the controller develops the control signal based at least in part on a number of discharges that have occurred in the discharge chamber.

11. A laser comprising:
    a discharge chamber;
    a first electrode positioned at least partially within the discharge chamber and fixed with respect to the discharge chamber;
    a second electrode positioned at least partially within the discharge chamber, the first electrode having a first discharge surface and the second electrode having a second discharge surface, the first discharge surface and the second discharge surface being arranged to confront one another across a gap;
    a motor mechanically coupled to the second electrode to position the second discharge surface to control a width of the gap; and
    a controller connected to the motor wherein the controller supplies a control signal to make the width of the gap substantially equal to an original gap width,
    a polarity of the first electrode being positive with respect to a polarity of the second electrode so that the first electrode functions as an anode during a discharge in the discharge chamber, the first electrode comprising a material that forms an erosion resistant coating when the first electrode functions as an anode during a discharge in the discharge chamber.

12. A laser as claimed in claim 11 wherein the controller develops the control signal based at least in part on a magnitude of a voltage differential between the first electrode and the second electrode during discharge.

13. A laser as claimed in claim 11 further comprising a detector connected to the controller for measuring a width of the gap and providing a signal indicative of the width wherein the controller develops the control signal based at least in part on the width as measured by the detector.

14. A laser as claimed in claim 11 wherein the controller develops the control signal based at least in part on a number of discharges that have occurred in the discharge chamber.

15. A method of controlling operation of a laser, the laser including a discharge chamber and a first electrode and a second electrode spaced apart by a gap, the second electrode being positionable to establish a width of the gap, the method comprising the steps of:
    operating the laser by causing a discharge to occur in the discharge chamber between the first electrode and the second electrode with a polarity of the first electrode being positive with respect to a polarity of the second electrode so that the first electrode functions as an anode during a discharge in the discharge chamber;
    measuring a width of the gap; and
    automatically controlling a position of the second electrode to make the width of the gap substantially equal to an original gap width.

16. A method of operating a laser including a first electrode and a second electrode, the first electrode and the second electrode spaced apart by a gap, the method comprising:
causing a first discharge to occur in the discharge chamber between the first electrode and the second electrode with a polarity of the first electrode being positive with respect to the second electrode so that the first electrode functions as an anode during the first discharge; and
causing a second discharge to occur in the discharge chamber between the first electrode and the second electrode with the polarity of the second electrode being positive with respect to the first electrode so that the second electrode functions as an anode during the second discharge.

17. The method as in claim 16, wherein causing a first discharge to occur in the discharge chamber causes a first erosion resistant layer to form on the first electrode functioning as the anode.

18. The method as in claim 17, wherein causing a second discharge to occur in the discharge chamber causes a second erosion resistant layer to form on the second electrode functioning as the anode.

19. The method as in claim 16, wherein the second electrode is positionable to establish a width of the gap and further comprising measuring an operational parameter of the laser and automatically controlling a position of the second electrode based at least in part on the measured operational parameter.

20. The method as in claim 19, wherein the measured operational parameter is a magnitude of a voltage differential between the first electrode and the second electrode required to achieve or maintain a predetermined output energy during the first discharge or the second discharge.

21. A method of operating a laser having a first electrode and a second electrode arranged in a discharge chamber, the first electrode and the second electrode being spaced apart by a gap, the method comprising:
forming a first erosion resistant layer on the first electrode by causing a first discharge to occur between the first electrode and the second electrode in the discharge chamber with a polarity of the first electrode being positive with respect to the second electrode so that the first electrode functions as an anode during the first discharge; and
forming a second erosion resistant layer on the second electrode by causing a second discharge to occur between the first electrode and the second electrode in the discharge chamber with a polarity of the second electrode being positive with respect to the first electrode so that the second electrode functions as an anode during the second discharge.

22. The method as in claim 21 wherein forming a second erosion resistant layer on the second electrode by causing a second discharge to occur between the first electrode and the second electrode in the discharge chamber with a polarity of the second electrode being positive with respect to the first electrode so that the second electrode functions as an anode during the second discharge comprises reversing a polarity of the electrodes.

* * * * *